United States Patent Office 2,728,121
Patented Dec. 27, 1955

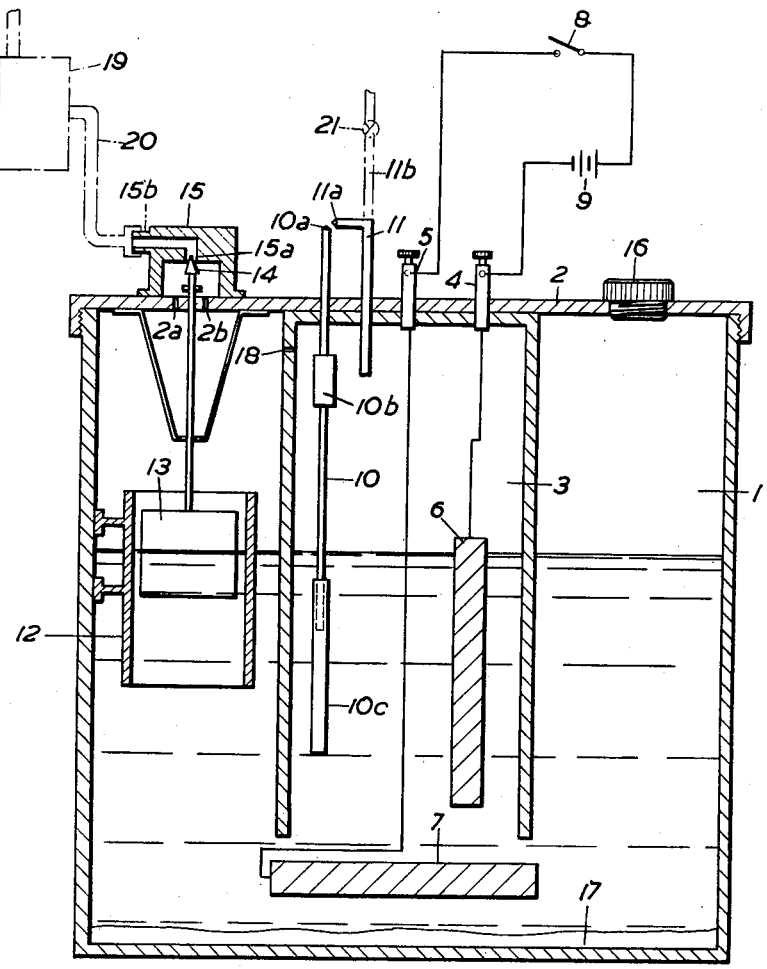

2,728,121

APPARATUS FOR STERILIZING AND DEODORIZING AIR

Vear Oliver Goument, Berwick-on-Tweed, England

Application December 4, 1951, Serial No. 259,842

8 Claims. (Cl. 21—107)

This invention consists in an improved method of and apparatus for sterilizing and deodorizing air.

Alkaline hypochlorite is well-known as a powerful oxidiser, and therefore sterilizer and deodorizer. The object of the invention is to provide apparatus for applying this sterilizing agent in the form of a fine spray for sterilizing and deodorizing the atmosphere in such places as water closets of private houses, hotels, hospitals, offices, public conveniences, theatres, cinemas, factories, railway carriages and stations, ships and the like: and in hospital operating theatres, fever wards, underground railways, air raid shelters, sewers, dairies, milking premises and the like—in fact any atmosphere where there is a liability for it to become contaminated. Applied as an attenuated moist vapour such hypochlorite is very effective in disposing of air-borne germs, while, at the same time, attacking and decomposing the constituents of offensive gaseous human emanations with great rapidity.

According to the invention a solution of a chloride of one of the two most active alkaline metals—sodium and potassium—is subjected to electrolysis to form a hypochlorite solution, and the hydrogen evolved is utilised to build up a pressure to form a fine spray, and preferably also to depress the level of the chloride solution electrolyte, so that by reducing the current passing between the electrodes, a balanced condition is reached at which the amount of hydrogen issuing from the spraying point is equal to the amount being evolved.

The apparatus according to the invention may comprise a storage chamber for containing the chloride solution, and an electrolysis chamber whose lower portion is in communication with the lower portion of the storage chamber, one of the electrodes in the electrolysis chamber being at an angle to the horizontal, while an atomizer device projects from the electrolysis chamber so that the hydrogen evolved in the latter is caused to atomize the resulting hypochlorite solution, said atomizer device comprising an immersion tube for immersion in the solution and an atomizer tube adapted to project into the atmosphere above the solution, the upper ends of the said tubes terminating in nozzles in juxtaposition according to well-known practice.

Where a generation of hypochlorite is desired for a prolonged period, the storage chamber may be connected to a water supply through a float-controlled inlet valve, so that according to the level of liquid in the storage chamber so will be the admission of fresh water. In such apparatus a supply of the chloride is desposited in the bottom of the storage chamber.

Preferably an enlargement is formed in the immersion tube leading from the electrolyte to slow down the upward movement of the solution pending the building up of pressure by the evolution of hydrogen.

The invention will now be described by way of example with reference to the accompanying semi-diagrammatical drawing which shows a form of apparatus for the supply of sodium hypochlorite for intermittent or prolonged use.

Referring more particularly to the drawing, 1 is a cylindrical jar of glass, plastic or other material, and forms an outer or storage chamber. The upper portion of the chamber 1 is threaded to receive a flanged lid 2; and concentrically mounted on the under side of the lid 2 is a cylindrical bell-like electrolysis chamber 3 of the same material as that of the chamber 1.

4, 5 are two terminals which project into the chamber 3 and are respectively connected to a vertical cathode 6 and a horizontal anode 7 arranged underneath the opening into the bell-like chamber 3. The terminals 4, 5 are on the outside connected through a switch 8 to a current source 9 which may be a battery or a trickle charger. Extending up from the lower portion of the electrolysis chamber 3 is a vertical tube 10 having at its upper end a fine nozzle 10a. Near the upper portion of the tube 10 inside the chamber 3 there is an enlargement 10b for receiving the initial liquid forced up the tube 10 when the apparatus is first put into action. An atomizer tube 11 extends from the upper portion of the chamber 3, and has its upper end bent at right angles and terminating in a spray nozzle 11a.

Secured to the wall of the chamber 1 is a cylindrical guide 12 in which is arranged for vertical movement a float 13 for controlling a needle valve 14 which is adapted to seat against a water supply orifice 15a formed in a valve box 15 mounted on the lid 2. The valve box 15 is adapted to be connected at 15b to any convenient supply source, e. g., a W. C. flushing system, a water main supply, or a small reserve tank. From the orifice 15a the water enters the chamber 1 through two small holes 2a, 2b in the lid 2.

16 is a stopper in the lid 2 for refilling or recharging the chamber 1.

17 is a supply of common salt (NaCl) lying on the bottom of the chamber 1, and serves to maintain the electrolyte solution at saturation point when more water is added either through the stopper 16 or through the supply orifice 15a.

A very small opening 18 is formed near the upper end of the chamber 3 to enable any disparity between the liquid levels in the chambers 1 and 3 slowly to adjust itself while the apparatus is inactive.

The operation of the apparatus is as follows: With the chamber 1 charged with water and common salt as shown, the switch 8 is closed.

The initial condition in the chamber 3 is to be taken as that normally existing in the well-known process of manufacturing sodium hypochlorite solution by electrolysis. Chlorine is formed at the anode 7 and caustic soda, with the evolution of hydrogen, at the cathode 6. The chlorine and caustic soda in solution combine to form sodium hypochlorite solution. Hydrogen, being only slightly soluble in the electrolyte, rises out of it and builds up a pressure above it. The pressure causes the gas to issue from the nozzle 11a, and the sodium hypochlorite solution to rise up the tube 10, feebly at first, but with increasing strength as the pressure rises. In order to prevent sodium hypochlorite solution dribbling away from the nozzle 10a before the force of gas issuing from the nozzle 11a has become sufficiently strong to disperse it into spray, the enlargement 10b in the tube 10 is provided. This enlargement is large enough to take all the liquid delivered up the tube 10 for about 15 or 20 seconds, at the end of which time the rate of gas emission from the nozzle 11a will be sufficient to cause atomization and dispersion. As, owing to the small size of the nozzle 11a, only a small proportion of the gas generated can escape from it, pressure continues to build up and the level of electrolyte in the chamber 3 continues to drop, and, of necessity, the level in the chamber 1 rises correspondingly. As time goes on the pressure in the chamber 3 reaches a stage such that the electrode 6 is partially submerged, the internal resistance between the electrodes 6 and 7 increases considerably, and a state of balance is reached at which the gas issuing from the nozzle 11a is just the amount being evolved from the electrode 6. This continues until the circuit is broken at the switch 8.

The length of time that the spray is allowed to issue varies with the different circumstances in which the apparatus is required to operate. In order to get this length of time adjusted to requirements, provisions for varying the length of the tube 10 is made. Variation is effected, either by providing different lengths of tube 10 to be screwed in below the enlargement 10b, or by arranging at the lower end of the tube 10 a short length of tube 10c to telescope over the tube 10; or by varying the current passing through the apparatus by suitable means. The shorter the length of the tube 10 for any given setting of level in the apparatus, the sooner the electrolyte level sinks below its end during operation. When this takes place hydrogen passes up the tube 10 and spray ceases.

An increase or decrease of spray delivery within a given time is secured by increasing or decreasing the size of the nozzle 10a to suit the conditions under which the apparatus is to operate. If the strength of the sodium hypochlorite solution is to be maintained satisfactorily, a corresponding amount of gas must be allowed to escape from the nozzle 11a in relation to the amount of solution lost from the nozzle 10a. This is a matter of design.

The manner by which the apparatus is to be brought into action or rendered inactive after it has been in operation is determined by the use to which it is to be put. In the case of W. C.'s the method is, for preference, a contact located in between the seat and the pan of the W. C. This contact is kept apart by a light spring until weight is put upon the seat, thereby closing the circuit. The contact will open again as soon as the weight is removed, thus terminating electrolytic action in the apparatus.

Alternatively a switch operated by the door may be used. This switch is automatically closed as soon as entry is made into the W. C. and is automatically opened again as the occupant opens the door to go out.

Any other method to open and close the circuit, including operation in conjunction with the flushing arrangements by means of a time switch, or the use of a contact, situated under a mat at the foot of the W. C. pan, which closes as weight is put on the mat, reopening when the weight is removed, or even simple manual operation, is suitable.

In the case of uses other than in W. C.'s, such as hospital, operating theatres, fever wards, air raid shelters and the like, the apparatus may be set into operation and turned off by a time switch; or by a manually operated switch where a prolonged spray or occasional use is desired. For such uses as these an oversized nozzle 11a is necessary so that the state of balance is reached while the level of electrolyte is still fairly high on the electrode 6, and the length of the tube 10 is, of necessity, such as to ensure the lower end being well submerged at this state of balance.

As soon as the current is cut off, by whichever method is used, the pressure in the apparatus subsides as the remaining hydrogen escapes from the nozzle 11a, and an approximate equation of the levels of liquid in both chambers 1 and 3 takes place. If there is any difference the small hole 18 will effect a slow adjustment. This hole is so small that its influence is negligible when the apparatus is in operation.

As the levels become adjusted, the float 13 falls slightly and lowers the valve 14 from the orifice 15a, thereby admitting through the latter the amount of water of replacement necessary to keep the level up to that set for the apparatus.

In situations where prolonged operation is desired, and a supply of common salt at the bottom of the chamber 1 is insufficient to meet needs, an additional closed receptacle 19 (shown in chain line), containing common salt, situated on the water pipe line 20 is necessary. Water passing through this receptacle on its way to the orifice 15a emerges as brine.

The chamber 1 is of such dimensions relative to the chamber 3 that it will accommodate the liquid forced out of the latter without generating a dangerous pressure in the apparatus. And, if in certain circumstance, it is considered unnecessary to equip the apparatus with the inlet water refilling device described above, the capacity of the chamber 1 is also sufficient to give a satisfactory length of life in between the high and low level marks at which the apparatus will function efficiently without refilling.

The tube 11 may be fitted with a branch 11b and tap 21 above the lid 2 as shown in chain line. When the tap 21 is open, it permits the passage of hydrogen to an additional receptacle (not shown) provided with similar nozzles to those at 10a and 11a. The object of this arrangement is to provide a simultaneous spray of any substance for supplementary effect—aromatic, medicinal, or antiseptic. Suitable substances of this nature are very numerous. Paradichlorbenzine in a solvent, asthma cures and palliatives, and emulsions of coal tar disinfectants may be mentioned as examples. This may be equally well provided for by having a tube similar to the tube 10 with its own entry into the chamber 3, instead of having a branch on the tube 10.

The roles of the chambers 1 and 3 may be reversed in the interests of design, if desired.

Before bringing a new apparatus into use for the first time, after it has been charged with salt and water, a prolonged charge is necessary in order to produce a sodium hypochlorite solution of sufficient strength to enable the apparatus to produce the result required from it. A considerable residue of sodium hypochlorite solution will be present already at subsequent refillings.

It should be noted that continuous or too prolonged use of the apparatus is to be avoided for the reason that such use results in generation of heat due to resistance in the electrolyte with consequent formation of chlorate.

I claim:

1. Apparatus for sterilizing and deodorizing air comprising a storage chamber for containing chloride solution, an electrolysis chamber whose lower portion is in communication with the lower portion of the storage chamber, a pair of electrodes in said electrolysis chamber one of said electrodes being at an angle to the horizontal, an atomizer device projecting from the electrolysis chamber so that the hydrogen evolved in the latter is caused to atomize the resulting hypochlorite solution, said atomizer device comprising an immersion tube for immersion in the solution and an atomizer tube adapted to project into the atmosphere above the solution, the upper ends of the said tubes terminating in nozzles in juxtaposition.

2. Apparatus according to claim 1 wherein a prolonged generation of hypochlorite is provided, the storage chamber being connected to a water supply through a float-controlled inlet valve, whereby the level of liquid in the storage chamber will be proportional to the admission of fresh water.

3. Apparatus according to claim 1 wherein an enlargement is formed in the immersion tube leading from the electrolyte to slow down the upward movement of the solution pending the building up of pressure by the evolution of hydrogen.

4. Apparatus according to claim 1 wherein the immersion tube is telescopic for the purpose of varying the length of time the spray is allowed to issue.

5. Apparatus according to claim 2 wherein a receptacle is arranged in the water supply line to supplement the supply of salt solution.

6. Apparatus according to claim 1 comprising additional atomizer tube means adapted to be connected to additional atomizer means.

7. Apparatus according to claim 1 comprising switch means for controlling the electrolysis circuit, said switch means being located relatively to the room in which the apparatus is to be used, and a movable member associated with said room and operatively connected to said switch means, whereby on moving said movable member said switch means are operated.

8. Apparatus according to claim 1 including time switch means for controlling the electrolysis circuit.

References Cited in the file of this patent

UNITED STATES PATENTS

| | | |
|---|---|---|
| 354,798 | Lorimer | Dec. 21, 1886 |
| 2,021,521 | Sargent | Nov. 19, 1935 |
| 2,204,506 | MacDougall | June 11, 1940 |
| 2,205,898 | Chandler | June 25, 1940 |